(12) United States Patent
Chen et al.

(10) Patent No.: US 7,814,474 B2
(45) Date of Patent: Oct. 12, 2010

(54) UPDATABLE MOBILE HANDSET BASED ON LINUX WITH COMPRESSION AND DECOMPRESSION TECHNIQUES

(75) Inventors: Shao-Chun Chen, Aliso Viejo, CA (US); James P. Gustafson, Irvine, CA (US); Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1296 days.

(21) Appl. No.: 11/316,291

(22) Filed: Dec. 21, 2005

(65) Prior Publication Data

US 2006/0190939 A1 Aug. 24, 2006

Related U.S. Application Data

(60) Provisional application No. 60/638,069, filed on Dec. 21, 2004.

(51) Int. Cl.
*G06F 9/44* (2006.01)
*G06F 9/445* (2006.01)

(52) U.S. Cl. .................. 717/168; 717/173; 717/178
(58) Field of Classification Search ............... 717/168, 717/173
See application file for complete search history.

(56) References Cited

U.S. PATENT DOCUMENTS 5,715,462 A * 2/1998 Iwamoto et al. ............ 717/173

| | | | | |
|---|---|---|---|---|
| 5,930,504 A | * | 7/1999 | Gabel | 713/2 |
| 6,070,012 A | * | 5/2000 | Eitner et al. | 717/168 |
| 6,367,072 B1 | * | 4/2002 | Justice et al. | 717/168 |
| 6,493,871 B1 | * | 12/2002 | McGuire et al. | 717/173 |
| 7,089,549 B2 | * | 8/2006 | Venkiteswaran | 717/170 |
| 2004/0244008 A1 | * | 12/2004 | Lee | 719/310 |
| 2005/0055595 A1 | * | 3/2005 | Frazer et al. | 713/400 |

FOREIGN PATENT DOCUMENTS

WO       WO 9632679       * 10/1996

OTHER PUBLICATIONS

Bendel (Linux Kernel Installation, Linux Journal, Nov. 1997, Issue 43es).*
Yang et al (Reuse Linux Device Drivers in Embedded Systems, 1998 International Computer Symposium Workshop on Software Engineering and Database Systems Dec. 17-19, 1998).*
Bokun et al (Active Badges—The Next Generation, Linux Journal, Oct. 1998, Issue 54).*

* cited by examiner

*Primary Examiner*—Lewis A Bullock, Jr.
*Assistant Examiner*—Hang Pan

(57) ABSTRACT

There are two different types of compression used on the Embedded Linux Platform that the present invention is targeting. For the kernel, a singular compression is used. A whole kernel is compressed into a single compressed zImage by zlib at once. When the kernel is loaded into RAM, the whole kernel has to be decompressed to RAM and executes there. The root file system is built through the CramFS that employs a different compression mechanism. It is a block-based compression. When the device is running, it is not necessary to load the whole file system to RAM. The kernel mounts the file system and performs the decompression on a file when it is needed.

12 Claims, 10 Drawing Sheets

UPDATABLE MOBILE HANDSET BASED ON LINUX WITH COMPRESSION AND DECOMPRESSION TECHNIQUES

RELATED APPLICATIONS

The present application makes reference to, is a continuation of, and claims benefit of U.S. Provisional Patent Application, 60/638,069, entitled "UPDATABLE MOBILE HANDSET BASED ON LINUX WITH COMPRESSION AND DECOMPRESSION TECHNIQUES", filed on Dec. 21, 2004, the complete subject matter of which is hereby incorporated herein by reference, in its entirety.

The present application makes reference to PCT Application with publication number WO/02/41147 A1, PCT number PCT/US01/44034, filed 19 Nov. 2001, which in turn is based on a provisional application 60/249,606 filed 17, Nov. 2000, both of which are incorporated by reference in their entirety. It also makes reference to a U.S. patent application Ser. No. 10/903,394 filed Jul. 30, 2004, titled "ELECTRONIC DEVICE NETWORK SUPPORTING COMPRESSION AND DECOMPRESSION IN ELECTRONIC DEVICES" which is also incorporated by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

There is a problem with generating update packages in an efficient mode when at least a portion of the content in a mobile phone image is compressed, or encrypted, or both. There is a problem in updating code in the mobile handset when the code is compressed.

When a operating system such as Linux is used in a mobile device, the file system is likely to be using some compression technologies. It is quite complicated to update firmware or kernel when it is compressed. It is often not possible to determine how much space is needed if such code is to be updated. It is not possible to update the code using techniques that you would employ if the firmware was not compressed. These techniques all have to be replaced by different techniques that address the constraints of such a mobile device. In addition, the Linux systems have their own file systems on top of a kernel. These file systems impose their own access mechanisms, etc. Thus, updating Linux based mobile devices is not easy or trivial and new techniques have to be developed.

Often there are at least two different types of compression used on the Embedded Linux Platforms. Updating firmware or software in Linux platforms where compression techniques are used is very difficult.

Other problems and deficiencies of the prior art will become apparent to one skilled in the art after referencing such art in view of the reminder of this specification and drawings.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a mobile handset network to employ compression and decompression mechanisms in order to update firmware and software in mobile handsets that might be partially or totally compressed, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

The numerous objects and advantages of the present invention may be better understood by those skilled in the art by reference to the accompanying figures in which.

DETAILED DESCRIPTION OF THE INVENTION

Aspects of the present invention relate generally to the update of mobile devices that contain firmware and software, wherein at least some of the firmware and software may be stored in a compressed form. The following discussion makes reference to the term "electronic device" that is used herein to refer to mobile electronic devices such as, for example, a mobile handset, a cellular phone, a personal digital assistant (PDA), a pager, and a personal computer, to name just a few. Although the listed example electronic devices are mobile devices, application of the present invention is not limited in this manner, as representative embodiments of the present invention may be employed in a wide variety of electronic devices, both fixed and mobile. The following discussion makes reference to the term "Linux" that is used herein to refer to open source UNIX based operating systems, especially those employed in mobile devices. The following discussion also makes reference to the term "network" that is used herein to refer to networks such as, for example, an operator network, an enterprise network, an Internet based network, a management network for a service, etc.

Electronic devices may be adapted to access servers to retrieve update information for updating memory in the electronic devices. An electronic device may be, for example, a mobile electronic device having firmware/software such as mobile cellular phone handsets, personal digital assistants (PDAs), pagers, MP-3 players, digital cameras, to name just a few. Update information may comprise information that modifies or changes firmware/software and/or software components installed in the electronic device. In a representative embodiment of the present invention, update information may comprise a set of executable instructions for converting a first version of code to an updated/second version of code. The update information may add new services to the electronic device, as desired by a service provider, device manufacturer, or an end-user, and/or may fix bugs (e.g., errors) in the operating code of the electronic device. In a representative embodiment of the present invention, update information may comprise an update package.

Figure 1:
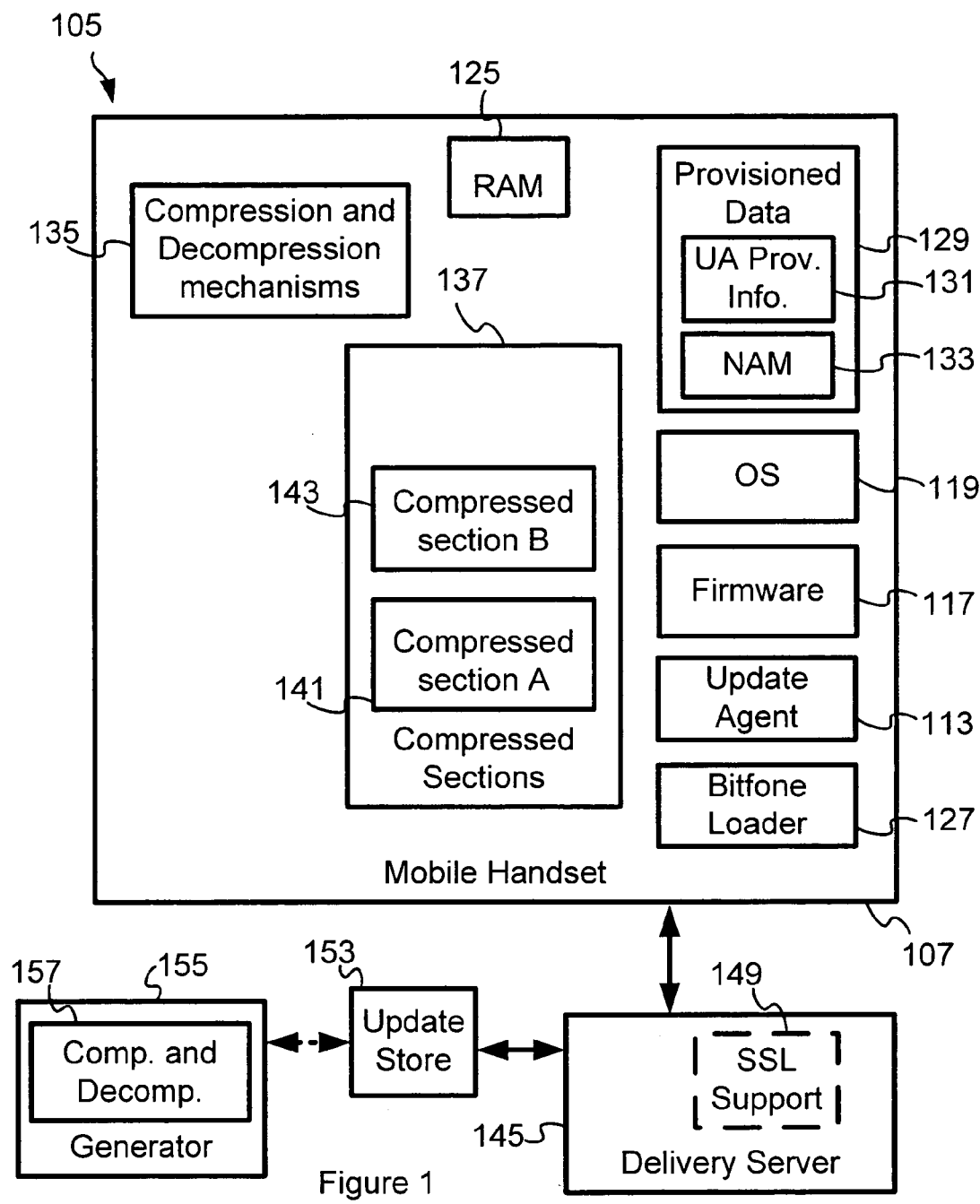
FIG. 1 is a perspective diagram of a mobile handset network that employs compression and decompression mechanisms in order to update firmware and software in mobile handsets that might be partially or totally compressed.

FIG. 1 is a perspective diagram of a mobile handset network 105 that employs compression and decompression mechanisms 135 in order to update firmware 117 and software 119 in mobile handsets 107 that might be partially or totally compressed. The mobile handset network 105 comprises a generator 155 capable of generating update packages that are employed to update firmware 117/software 119 in mobile handsets 107, an update store 153 that acts as a repository of update packages, a delivery server 145 that dispenses update packages and the mobile handset 107 that retrieves update packages from the delivery server 145 to update its firmware 117/software 119, at least some portions of which is compressed.

There are two different types of compression used in the mobile handset 107 that is based on an Embedded Linux Platform. For the kernel, a singular compression, represented by compressed section A 141, is used. A whole kernel is compressed into a single compressed zImage by zlib at once. When the kernel is loaded into RAM 125, the whole kernel has to be decompressed to RAM and executes there.

The root file system is built through the CramFS. It is a block-based compression. When the device is running, it is not necessary to load the whole file system to RAM. The kernel mounts the file system and performs the decompression on a file when it is needed. The CramFS based compressed section is represented by compressed section B 143.

The two compressed sections 141, 143 have to be updated by two different methods. Although, the update packages can be packaged into one single update package that facilitates update of both compressed regions such that a user cannot notice the difference, the update agents 113 for the two regions are likely to be different. Internally, it has to be two different approaches to update the two regions that are compressed by the two totally different compression architectures.

In general, compression algorithms are placed in an embedded device, such as a mobile handset 107 (cell phones). The compression algorithms are implemented in hardware in one related embodiment, and in software in another related embodiment, and are employed to decompress code and data segments so that they can be updated in RAM using update packages (that may be downloaded or otherwise transferred to the mobile device). After the uncompressed code is updated, often in a fault tolerant mode, they are compressed and stored back in the non-volatile memory. Thus fault tolerant update of the compressed code and/or data segments are conducted in the mobile device. Typically, a fault tolerant update agent is employed for such update or firmware or software in the mobile handset 107. In one embodiment, the compression algorithms are embedded in a silicon compression engine that is accessible by an update core engine that is part of an update agent. In another embodiment, the compression engine is a software engine that is accessed by the update agent.

Figure 2:
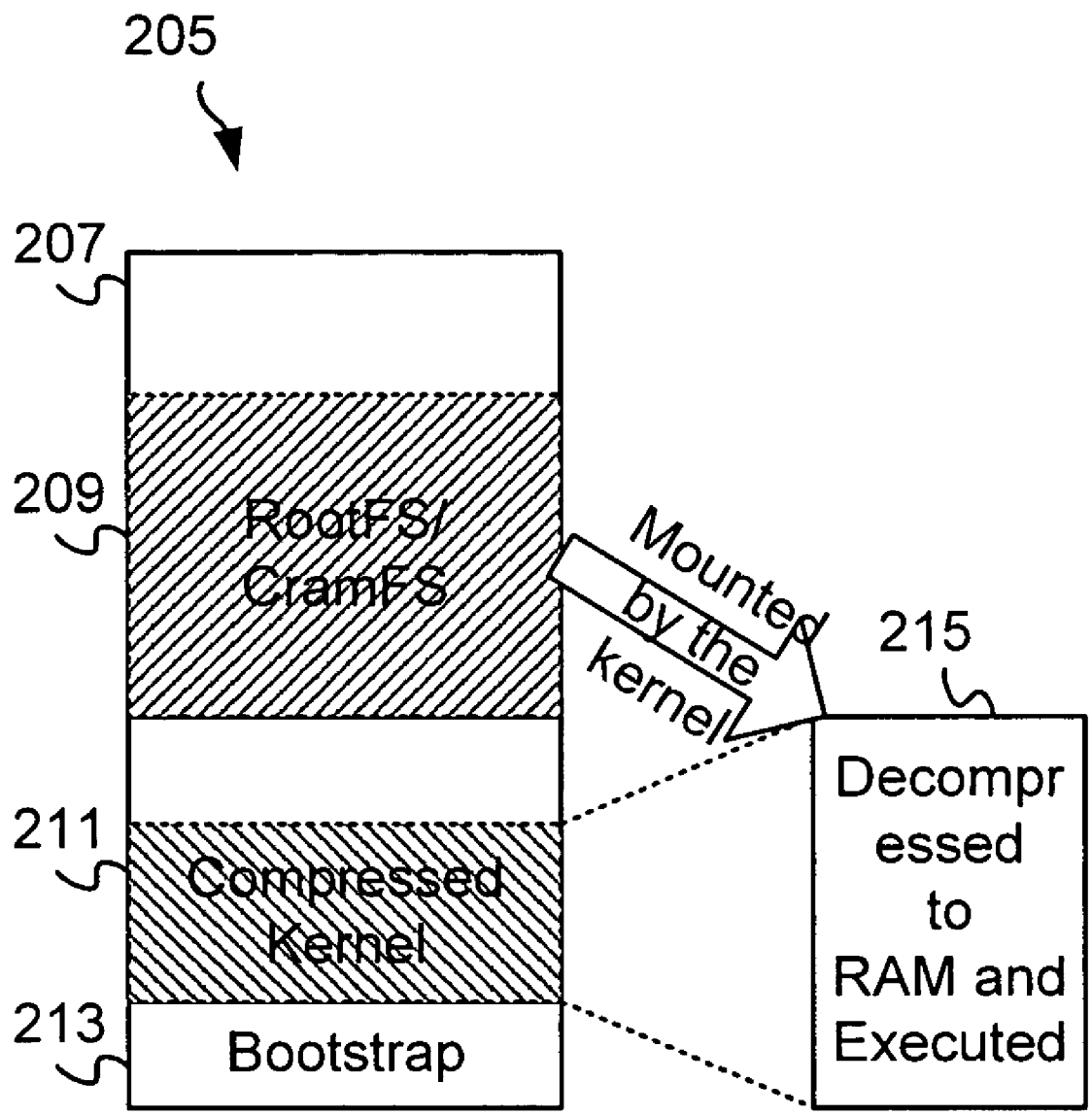
FIG. 2 is a perspective block diagram of a process used for the update of the compressed kernel of a Linux based mobile device.

FIG. 2 is a perspective block diagram of a process 205 used for the update of the compressed kernel of a Linux based mobile device. In one embodiment, the whole decompressed kernel needs to be loaded to RAM when it is run. The technique for updating the kernel, which is actually a compressed firmware, is one where the firmware image is split into the multiple compressed write units. This technique is applied effectively.

A non-volatile memory 207, such as FLASH memory, comprises a bootstrap section 213, a compressed kernel 211 and a root file system/CramFS 209. The compressed kernel 211 is typically decompressed to RAM 215 and executed. The root file system/CramFS 209 is mounted by the kernel in order to access the files in the CramFS 209 file system.

Figure 3:
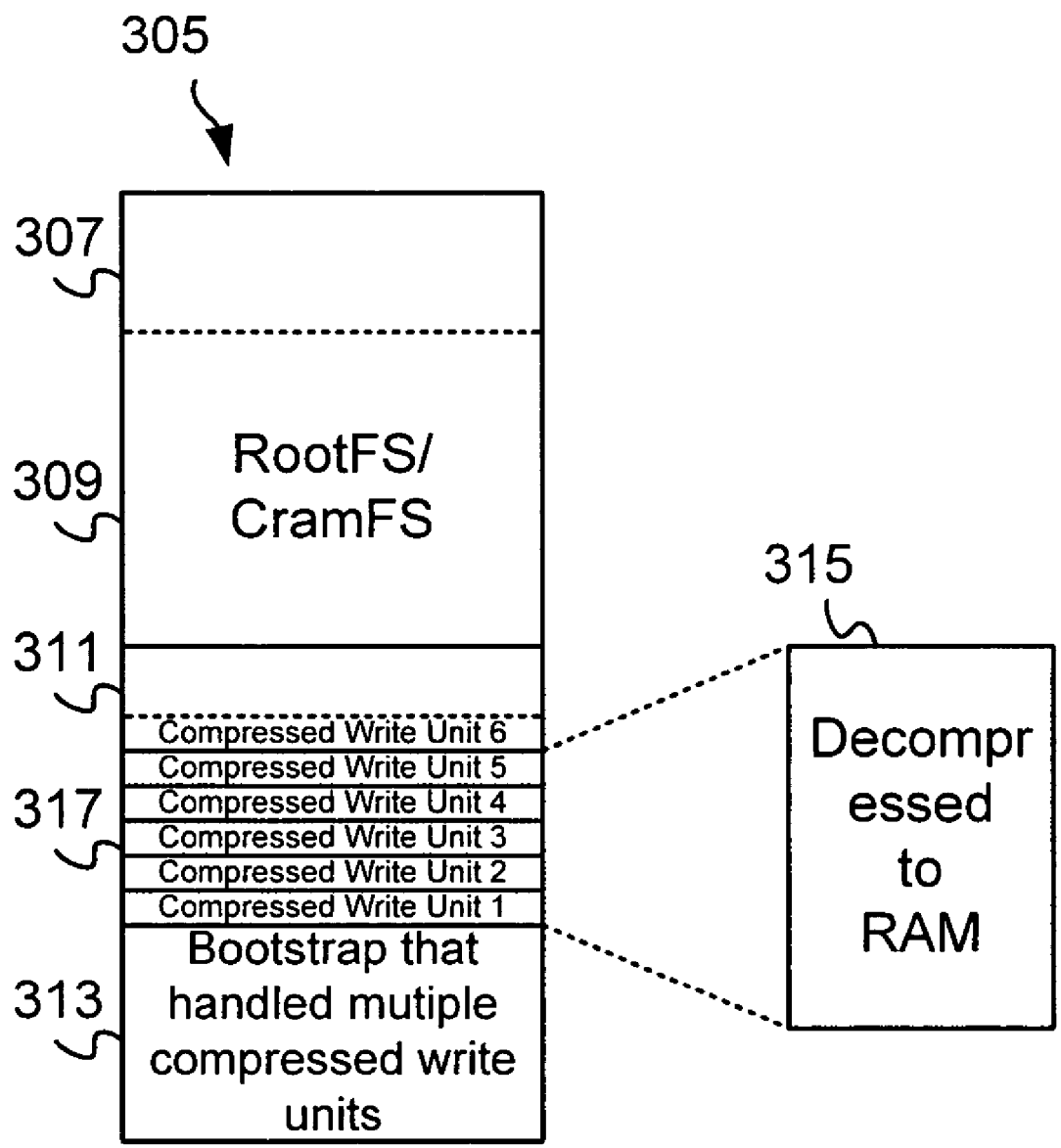
FIG. 3 is a perspective block diagram of a process used for the update of the compressed kernel of a Linux based mobile device.

FIG. 3 is a perspective block diagram of a process 305 used for the update of the compressed kernel of a Linux based mobile device. The whole decompressed kernel needs to be loaded to RAM when it is run. The technique for updating the kernel, which is actually a compressed firmware, is one where the firmware image is split into the multiple compressed write units. A non-volatile memory 307, such as FLASH memory, comprises a bootstrap code 313, a compressed kernel 311 and a root file system/CramFS 309. The compressed kernel 311 is typically decompressed to RAM 215 and executed. The compressed kernel is split into a set of compressed write units, such as the compressed write unit 317. The bootstrap code 313 handles multiple compressed write units in the compressed kernel 311.

In accordance with the present invention, there are also two alternatives/approaches that may be used to update the files in the CramFS region—"update as it is" and "update with decompression on demand". These two methods are not mutually exclusive. They coexists each other.

Figure 4:
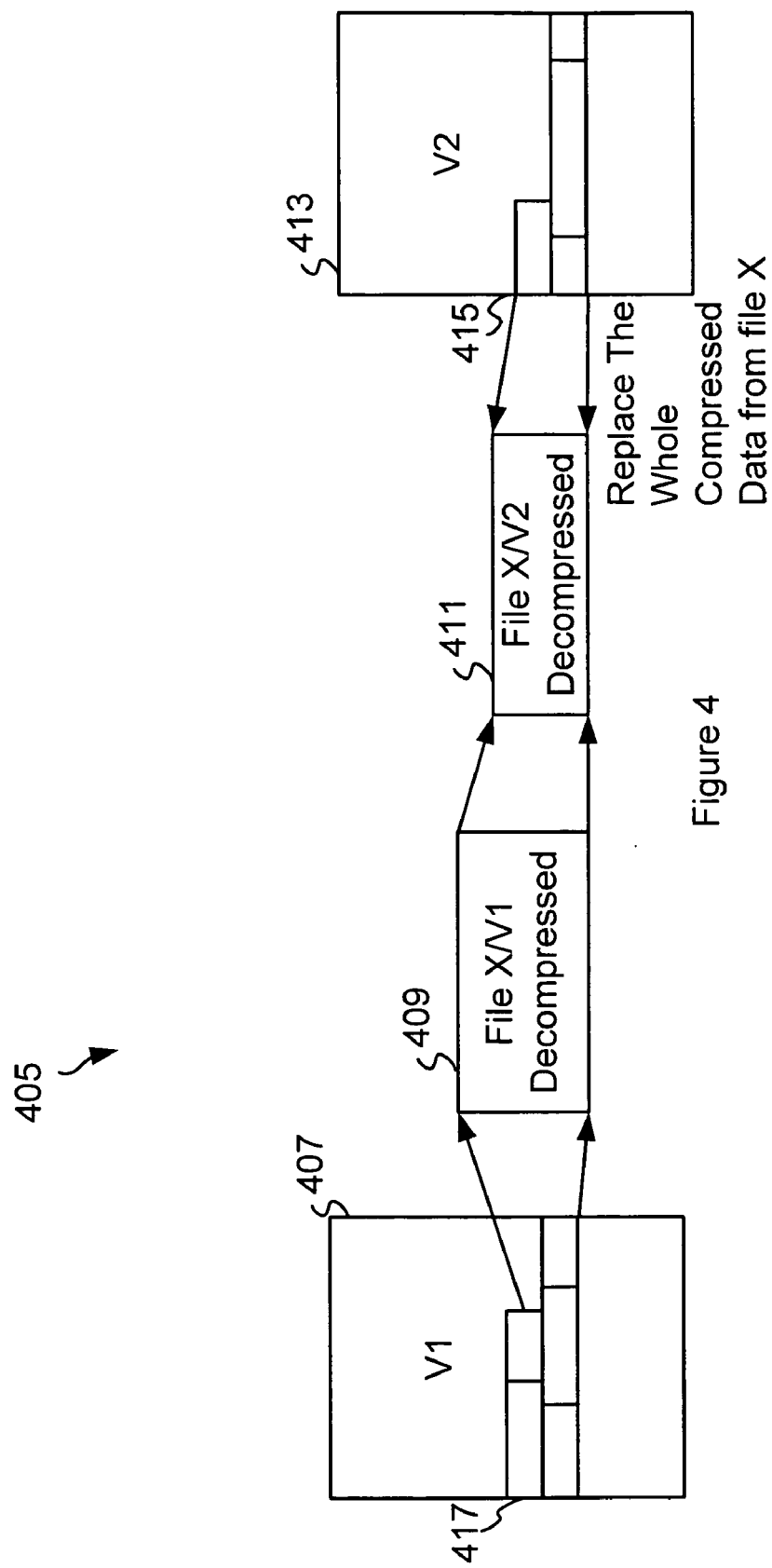
FIG. 4 provides a perspective block diagram that explains update as it is" approach/process of updating the CramFS file system components.

FIG. 4 provides a perspective block diagram that explains update as it is" approach/process 405 of updating the CramFS file system components. The "update as it is" approach is the easiest solution/approach. Since the files are compressed through the fragmented blocks, the compressed data blocks of the changed file does not affect the other files that are not changed. Therefore, only the changed file in its compressed form needs to be provided, and is carried, in the update package. Although, the whole compressed file is likely to be different even if it involves a slight/minor change in its uncompressed form, it does not affect any other compressed files.

A first version of a file X 417, in the first memory image V1 407, in compressed from in the non-volatile memory image 407, is decompressed and the decompressed file 409 is converted into the updated version for memory image V2 413, in decompressed form 411. The version of file X 411 for the memory image V2 is then used to replace the previous version of the file for version V1, with the compressed version of file V2 415 in the non-volatile memory image 413 of the mobile device. In a related embodiment, the decompressed file V1 409 is replaced by the decompressed file V2 411 in the RAM of the mobile device, before the decompressed file V2 is compressed and written back to the non-volatile memory 413 to replace the original version V1. Typically non-volatile memory 407 and 413 are one and the same.

Figure 5:
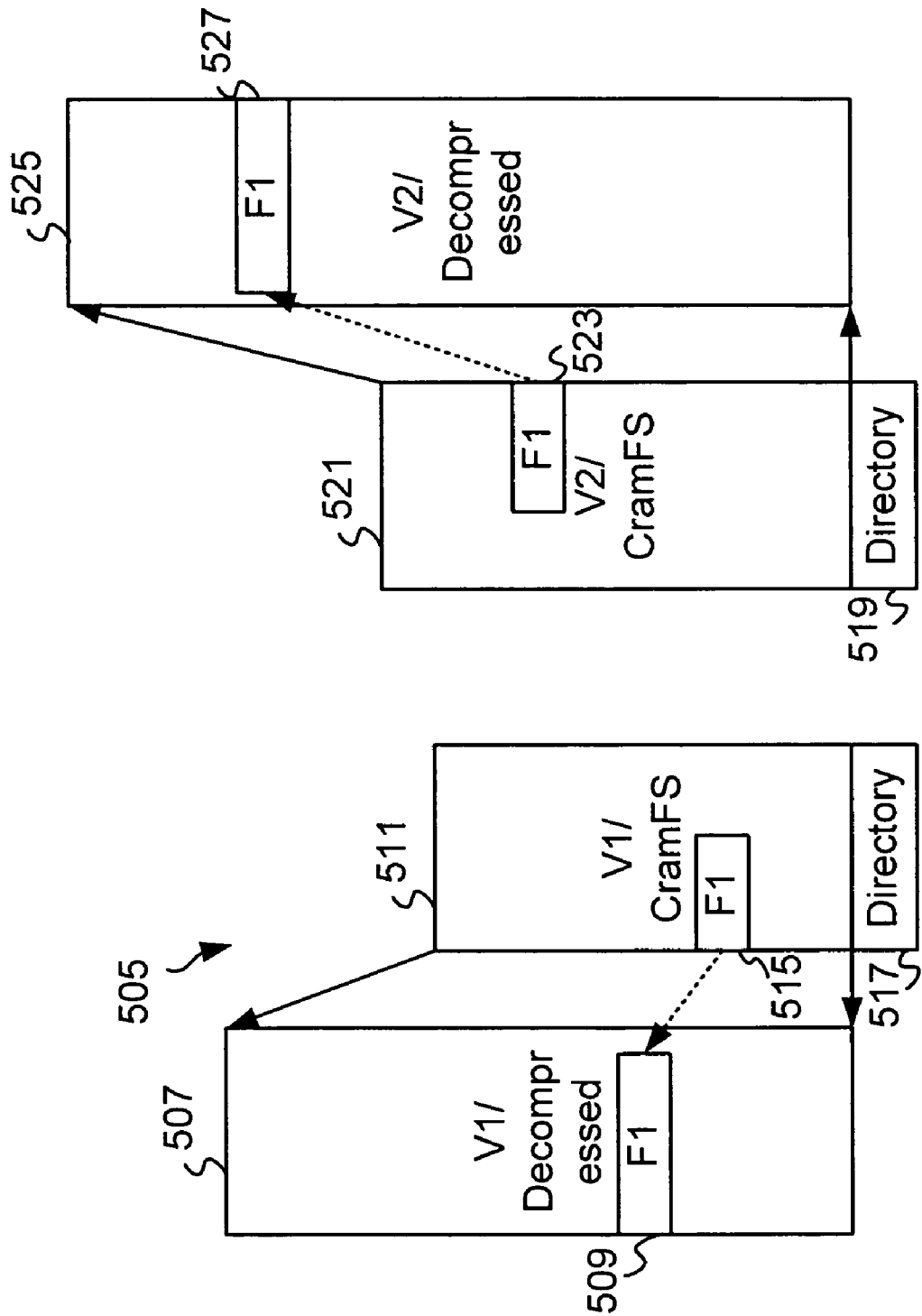
FIG. 5 is a perspective block diagram that explains an "update with decompression on demand (uDOD)" approach/process of updating the CramFS file system components.

FIG. 5 is a perspective block diagram that explains an "update with decompression on demand (uDOD)" approach/process 505 of updating the CramFS file system components. uDOD is a technique that does the update with a slightly more complex method than the one described in FIG. 4. It tries to decompress the information as much as possible and update the information in the uncompressed form. After the raw information is updated, the data is compressed and stored in the RAM to be used as the final update reference.

uDOD can be applied on the firmware that is compressed through the fragmented blocks that the compression of those blocks are not dependent on each other. The compression and decompression engine has to be able to be placed on both the Generator side and the update agent side, i.e. the device side. CramFS is one example that follows this requirement.

The Generator that is used to create the update package for such an update process has to build two types of the information for the reference image, the compressed one and the decompressed one. The Generator has the knowledge on how the compression/decompression works. It builds up the table required to map the information of the decompressed data to the information in the compressed data area among the two versions. The information in the table is collected either on a per file basis or on a per block basis.

The on demand information is built using a data scanning operation. In one embodiment, it is performed using the filenames.

Between the memory images v1 and v2, there are 4 types of the conditions that may change for a file.
1. File is added in v2. (File does not exist in v1.)
2. File is removed from v1. (File does not exist in v2.)
3. File is not changed, but its location is changed.
4. File is changed.

For the first 3 conditions, no decompression on demand (DOD) is needed. DOD is needed only for the 4th condition when a file is changed between v1 and v2. The basic concept is that the update is performed at the uncompressed level (as much as possible) for a detected changed file.

The CramsFS file system version of a file F1 in an older version of a memory image V1 511 can be accessed fro the directory 517 in its compressed form. It's decompressed form F1 509 that is part of a decompressed memory image 507 can be analysed to detect its layout and size before comparing it to a newer version in an updated image V2 521. The updated or newer image 521 comprises of the updated version of the file F1 which is accessible using the directory 519 for the newer memory image V2 521. The decompressed version of the updated file F1 527 with the decompressed memory image 525 can be compared to the decompressed form of the original file F1 509 to generate a difference information (by a generator) that is sent to the mobile device as part of the update package.

Figure 6:
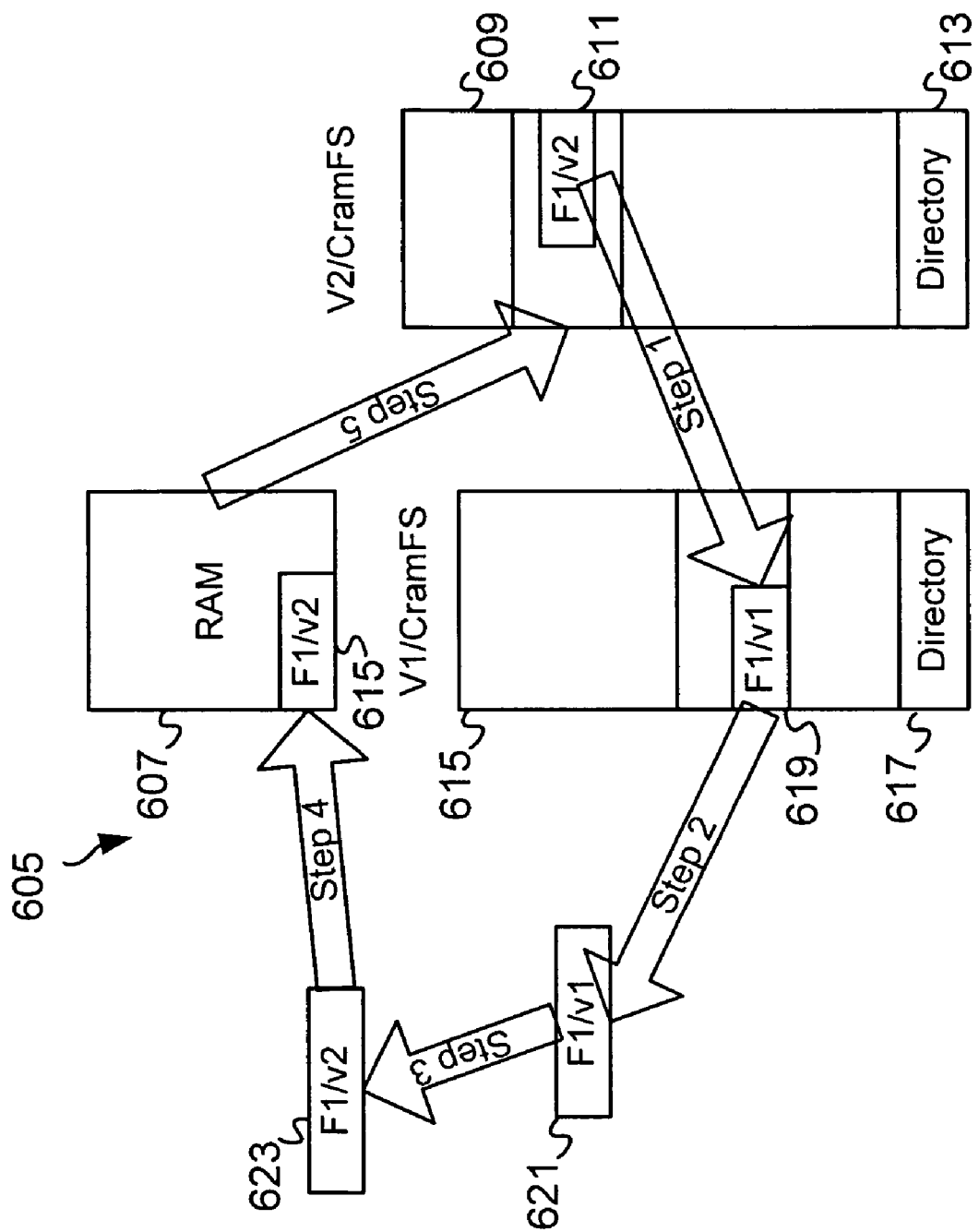
FIG. 6 is a flow chart of the process of updating a file within the CramFS based file system in a mobile device.

FIG. 6 is a flow chart of the process 605 of updating a file within the CramFS based file system in a mobile device. Initially, the generator detects that the file F1 611 in the new image V2 609 is different form the file F1 619 in the older version V1 619. The appropriate write unit that contains the file F1 is noted. Instructions are developed to instruct the update agent to decompress F1. Furtehr instructsions are developed to instruct the update agent to update the decompressed file F1 in RAM to the updated version of the same file F1 associated with image version V2. The update is expected to occur in a mobile device in the decompressed form of the file. Finally, instructions to compress the update version of the file F1 are developed. The updated file is to be placed in the RAM buffer in the device after the update. Instructions to write the update file to the CramFS file system location are also incorporated. The copy of the update file may be retained in the device in the RAM buffer, if necessary.

The following is a step-by-step description of the process of generation:

Step 1: The write unit to be updated contains a file F1. The Generator detects that F1 is changed from version 1 to version 2.

Step 2: The Generator instructs the Agent to decompress F1.

Step 3: The decompressed F1 is updated to F1 of version 2 in the decompressed form.

Step 4: The F1 of version 2 is compressed based on the same compression technique. The compressed F1/version 2 is placed in the RAM buffer as the source information.

Step 5: The Agent can complete the final update by referring the newly updated F1/version2 that stays in the RAM buffer as its dictionary source.

Although the generation and the update process has been described with reference to one file F1, it should be clear that the uDOD process is designed to be used with multiple files. More specifically, oin a real update, multiple uDOD files can be processed for updating one write unit.

Figure 7:
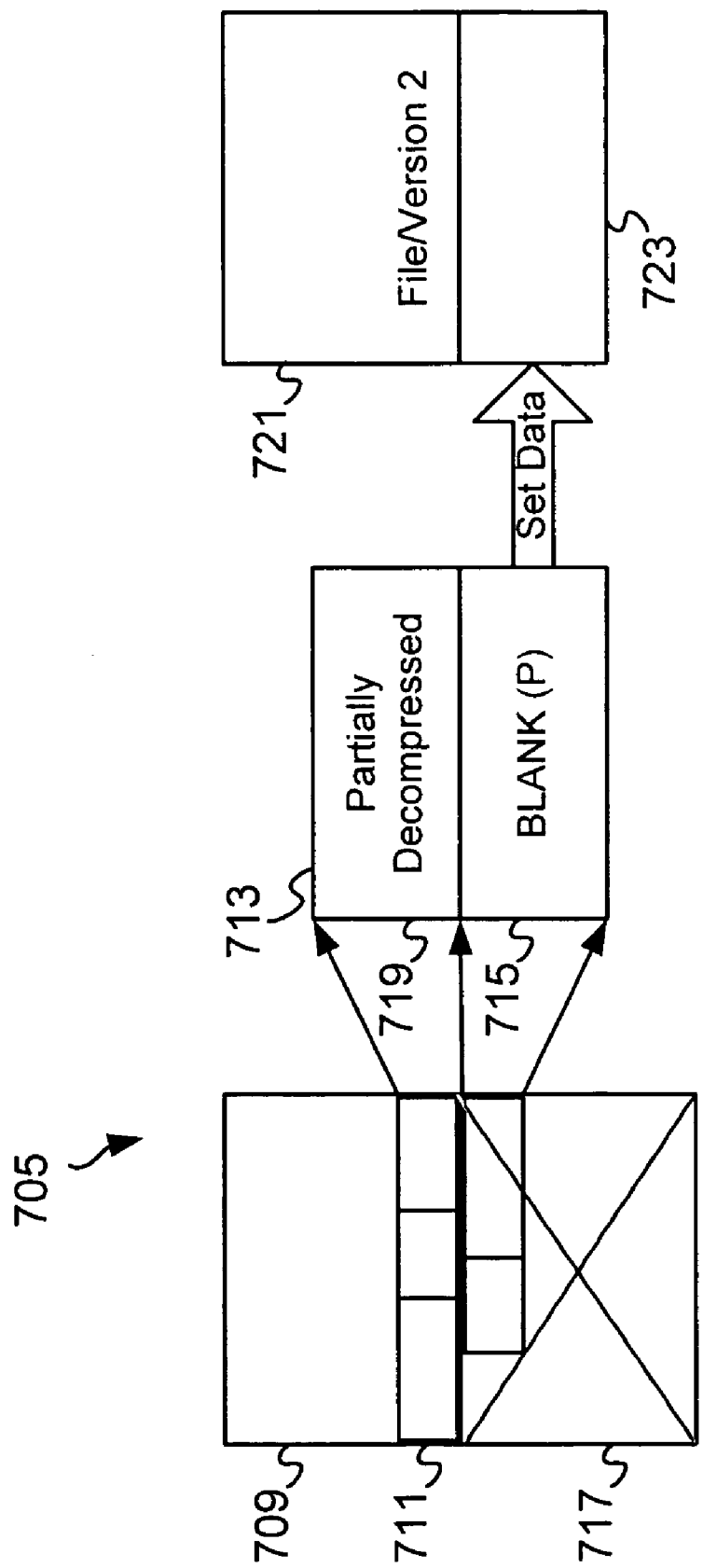
FIG. 7 is a block diagram depicting the procedure for reconstruction of a file from broken pieces of the file.

FIG. 7 is a block diagram depicting the procedure for reconstruction of a file from broken pieces of the file 711. During the update process wherein multiple files need to be updated, some files may get partially destroyed and a 'set data' operation needs to be employed to incorporate the missing/destroyed data. It is possible that only partial information exists when an uDOD is requested, such as the partially decompressed data 719. Fortunately, the compression is block based. There is still part of the information 719 that can be decompressed as the update source. The rest of the missing information 715 for the file may be "padded". The padding "(P)" employed can be a pattern, if a common pattern among files on that platform can be found. For example, it can be all-zero, or all-one. If the uDOD on a single file 711 is referred more than one once and its broken pieces are different among those references, only the common pieces should be used for the decompression to save the update instructions. Thus the partially decompressed section 719 of the file would then be the common pieces. The newer version of the file 721 would then require the use of the 'set data' command in the update package to compensate for the missing parts/sections of the file.

Figure 8:
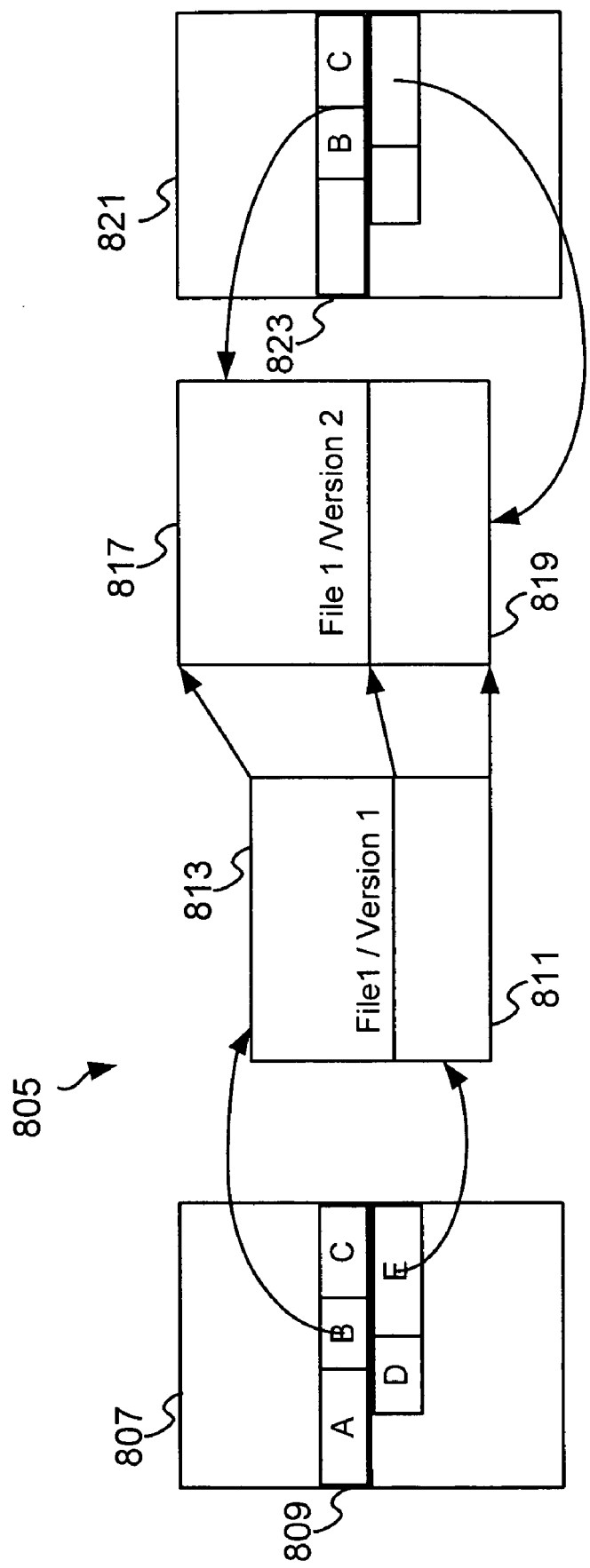
FIG. 8 is a block diagram depicting the compression partitioning approach employed when a compressed file that gets updated/changed is broken into different segments and each segment has its corresponding compressed block(s) in the new updated version of the file.

FIG. 8 is a block diagram depicting the compression partitioning approach employed when a compressed file that gets updated/changed is broken into different segments and each segment has its corresponding compressed block(s) 823 in the new updated version of the file 817. Thus, the file is partitioned and processed as shown in the figure. The reason to partition a file is to reduce the probability of the missing broken pieces that would otherwise be more likely to occur.

Thus, a file F1 that corresponds to partitions A, B, and C of the set of blocks 809, which, when decompressed, becomes file File1 of version 1 813, with the discarded or padded component 811. The updated file corresponds to File 1 version 2 817 and its associated discarded or padded component 819. When the updated file 817 is compressed and stored back, its memory image will comprise of partitions only B and C (in this example) with partitions A, D and E padded or unused.

In one embodiment, the present invention is based on the removal of the dependency on the file directory for the decompression activity. Since the write units are likely to shift all over the place during the update activity in the mobile device, the decompression cannot rely on the existing file directory. Besides, the missing broken pieces may be the header of a file, which contains the information of the compressed blocks. To overcome those problems, the dependency to the file directory for doing decompression is eliminated. Thus, the update does not depend on the existing information in the file directory. The update package contains all the required directory information to support the update activities.

Figure 9:
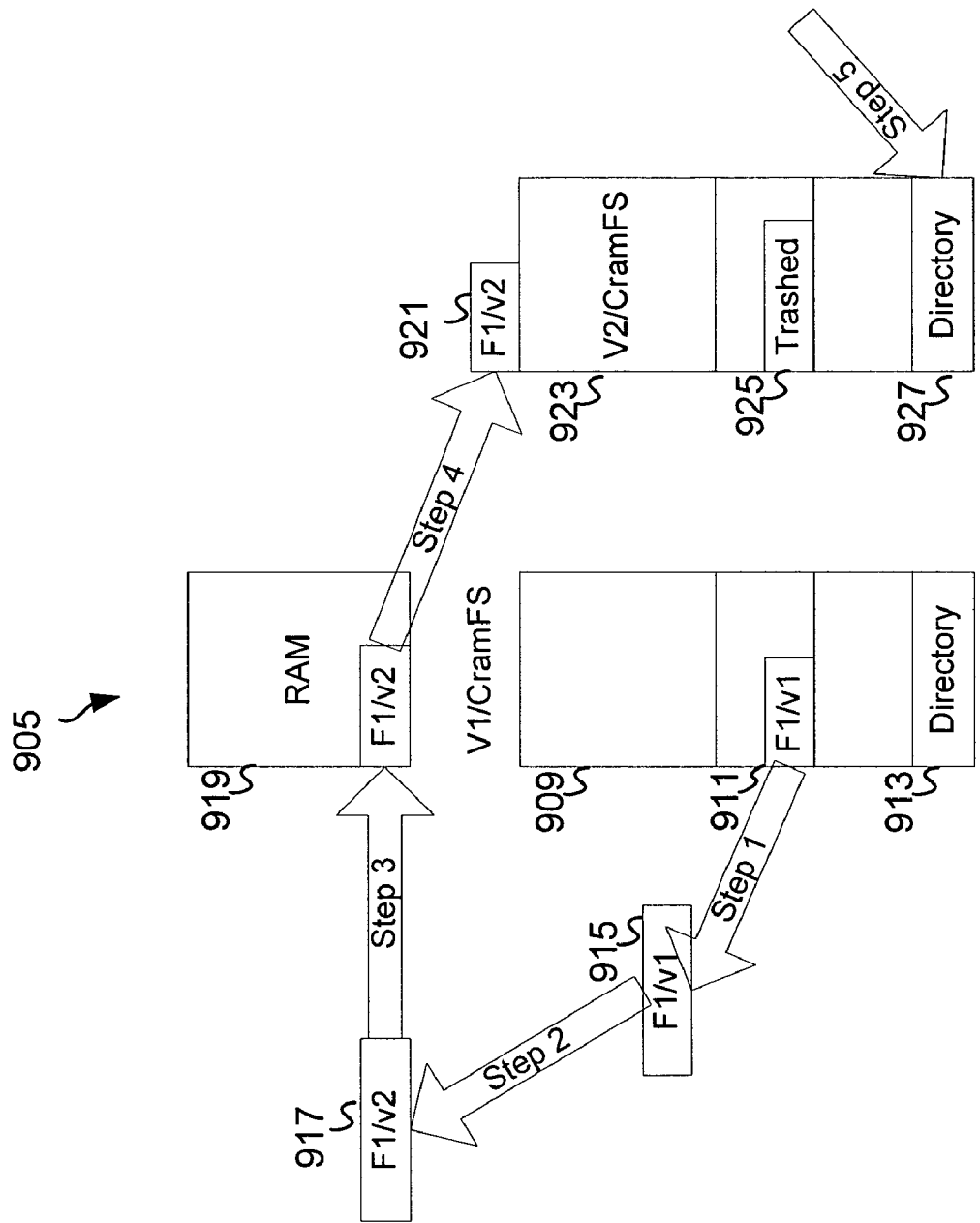
FIG. 9 is a process diagram that depicts update of a file in an embedded Linux based mobile device wherein the file system is allowed to be fragmented following the update activity.

FIG. 9 is a process diagram that depicts update of a file in an embedded Linux based mobile device wherein the file system is allowed to be fragmented following the update activity. This present invention proposes this additional approach to updating the compressed ROM file system that is used on the embedded Linux based mobile devices.

Specifically, it supports updating a file even when the fragmentation of file is possible. The basic approach is summarized as—"Put the updated file in the free space, then change the inode information to point to the updated file." As a side effect, the original space occupied by the old version of the file now becomes an unused space. The image is thus fragmented.

The following are the steps of this approach to updating file in the device when the device comprises an embedded Linux operating system:

Step 1: Decompress the compressed file 911 F1 V1 to generate the decompressed file 915 of version 1 (File change is detected based on the data scanning.)

Step 2: Update the file based on the decompressed information, generating the file F1 V2 917.

Step 3: Compress the updated file 917 to generate F1 V2 in RAM 919.

Step 4: Place the updated file in the free space 921 in the CramFS file system of the device.

Step 5: Change pointer of the inode information in the directory 927 to point to the newly updated file 921.

Thus, the original location of the file F1 V1 in the image is now trashed or unused space 925.

To build this new type of CramFS image based on fragmentation, a new tool is employed. that can create the CramFS image without breaking the structure that is standard while also optimizing the file placement for the update. In addition, defragmentation may be invoked when the free space available in the CramFS file system is not enough to place the newly updated file F1 V2 921.

The proposed approach is such that the target image is still predictable (prediction during the generation process), the manufacturer's digital signature is still applied for security, and the version management is still simple and straight forward.

Figure 10:
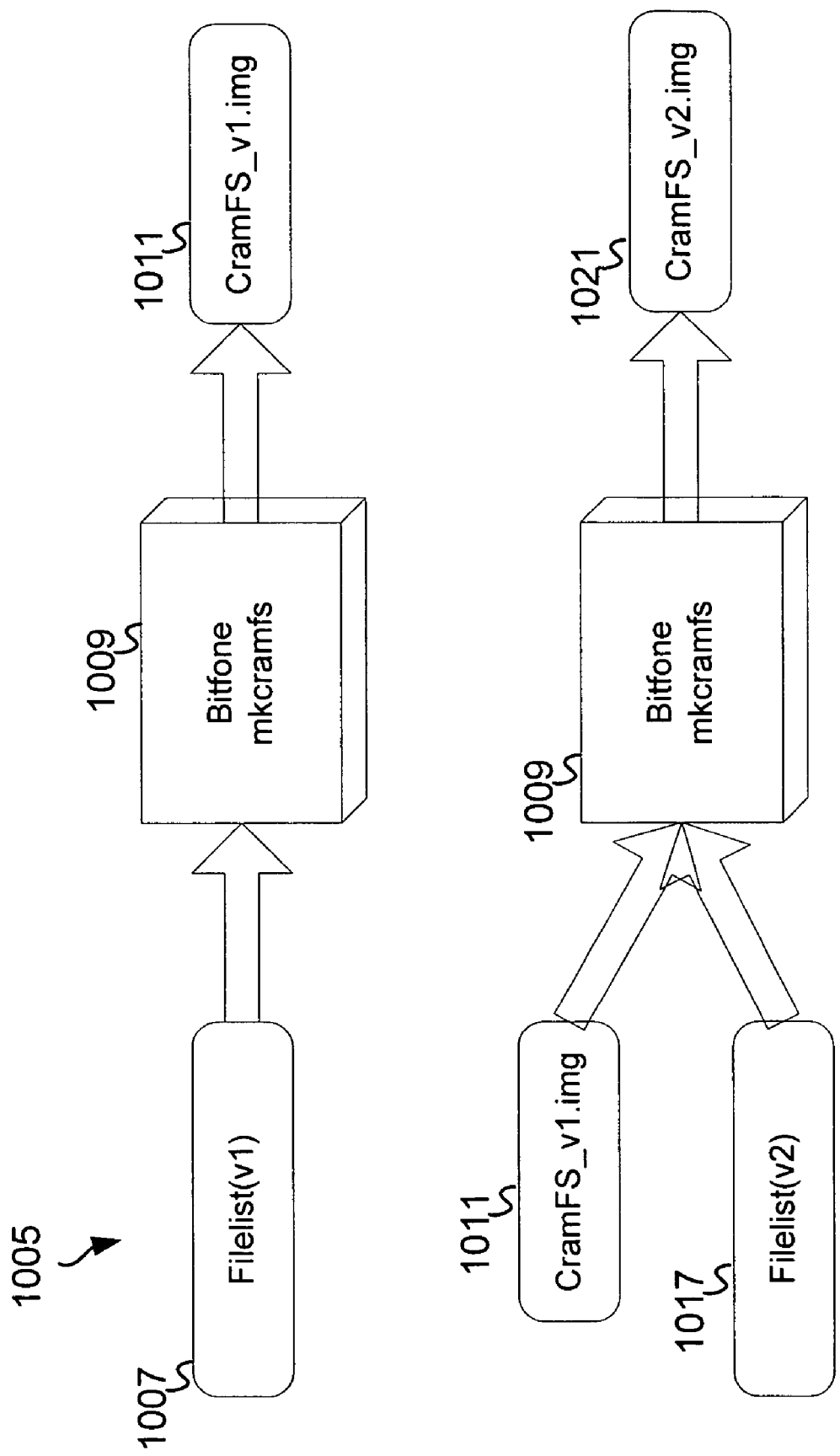
FIG. 10 shows the use of the mkcramfs tool in generating the necessary images incorporating the files that need to be updated.

FIG. 10 shows the use of the mkcramfs tool 1009 in generating the necessary images incorporating the files that need to be updated. When a filelist v1 1007 is provided as input to the mkcramfs tool 1009, and the tool is activated, it generates an output image CramFS_v1.img 1011. Subsequently, when the image CramFS_v1.img 1011 and the new file list of updated files, filelist v2 1017 is provided as input to the tool for processing, it generates the required updated image output CramFS_v2.img 1021.

In one embodiment, multiple update packages are used to update the mobile device. For example, one update package is used to update the compressed kernel and another update package is used to update the CramFS file system code blocks, which may also be in compressed form. In a related embodiment, the same update agent is capable of updating both the CramFS file system code blocks and the compressed kernel, but utilizing the appropriate update packages as needed.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mobile handset with a non-volatile memory and a volatile memory, with a compressed kernel and a block oriented compressed file system, the mobile handset comprising:

a memory comprising first and second sections, the first section comprising first compressed information comprising the compressed kernel, having a first compression architecture, and updatable by a first technique, and the second section comprising second compressed information comprising the block oriented compressed file system, having a second compression architecture, and updatable by a second technique;

a first update agent resident in non-volatile memory for updating the first compressed information using the first technique;

a second update agent resident in non-volatile memory for updating the second compressed information using the second technique;

an update package comprising a first portion for updating the first section comprising first compressed information and a second portion for updating the second section comprising second compressed information;

the first update agent decompressing the compressed kernel in volatile memory to selectively update the kernel in volatile memory in order to create an updated kernel;

the first update agent employing at least a portion of the first portion of the update package to selectively update the kernel to create an updated kernel;

the first update agent compressing the updated kernel in volatile memory to create an updated compressed kernel and replacing the compressed kernel with the updated compressed kernel;

the second update agent copying selected blocks of the block oriented compressed file system into the volatile memory, one block at a time, uncompressing a selected block, updating the selected block using at least another portion of the update package than the portion employed by the first update agent, compressing the selected block and writing the selected block back into the block oriented compressed file system to create an updated set of the selected blocks.

2. The mobile handset of claim 1 wherein the volatile memory is RAM, the non-volatile memory is FLASH memory, the kernel is a Linux kernel and the compressed file system is a CramFS file system.

3. The mobile handset of claim 2 wherein the update package facilitates update of at least one of the compressed kernel and the block oriented compressed file system.

4. The mobile handset of claim 3 wherein the first update agent conducts a fault tolerant update of the uncompressed kernel in RAM after the compressed kernel is copied to RAM and decompressed.

5. The mobile handset of claim 3 wherein the first update agent conducts a fault tolerant update of the uncompressed kernel in RAM after the decompressed kernel is copied to RAM.

6. The mobile handset of claim 2 wherein the whole compressed kernel needs to be loaded to the RAM as a decompressed kernel when it is run and wherein the first update agent splits the compressed kernel into multiple compressed write units for updating the compressed kernel and updates one write unit at a time.

7. The mobile handset of claim 2 wherein the compressed kernel comprises a plurality of compressed write units and wherein the first update agent updates each of the plurality of compressed write units individually in a fault tolerant manner.

8. A mobile handset with a non-volatile memory and a volatile memory, the mobile handset comprising:
  a compressed kernel having a first compression architecture and updatable by a first technique;
  a block oriented compressed file system having a second compression architecture and updatable by a second technique;
  an update agent resident in non-volatile memory;
  the update agent capable of updating the compressed kernel by the first technique and the block oriented compressed file system by the second technique;
  a first portion of an update package for updating the compressed kernel;
  a second portion of the update package for updating the block oriented compressed file system; and
  the update agent updating the compressed kernel by the first technique using at least the first portion of the update package and updating the block oriented compressed file system by the second technique using at least the second portion of the update package;
  the compressed kernel comprises a plurality of compressed write units;
  the update agent updates each of the plurality of compressed write units individually in a fault tolerant manner;
  the update agent decompressing each of the plurality of compressed write units, updating it in RAM employing the at least the first portion of the update package to create an updated write unit in RAM, compressing the updated write unit in RAM after the update and replacing the compressed write unit with the compressed contents of the updated write unit in RAM.

9. The mobile handset according to claim 8 further comprising:
  the update agent decompressing the compressed kernel in volatile memory to selectively update the kernel in volatile memory in order to create an updated kernel using the first portion of the update package.

10. The mobile handset according to claim 8 further comprising:
  the block oriented compressed file system comprising a plurality of compressed code blocks;
  the update agent updating the block oriented compressed file system using at least the second portion of the update package.

11. The mobile handset according to claim 10 further comprising:
  the update agent updating at least one of the plurality of compressed code blocks using at least the second portion of the update package.

12. A method of updating a Linux based mobile device, the mobile device comprising a compressed kernel and a CramFS file system, the method of updating comprising:
  accessing one update package; and
  updating the compressed kernel using a first updating technique, using the update package; and updating the CramFS file system of the Linux based mobile device using a second technique, using the update package;
  wherein the compressed kernel comprises a plurality of kernel code blocks and wherein updating the compressed kernel comprises:
  upgrading at least one of the plurality of kernel code blocks in a fault tolerant manner.
    wherein upgrading comprises:
    a first agent decompressing at least one of the plurality of kernel code blocks individually into a RAM to create a decompressed code block;
    modifying the decompressed code blocks using the update package to create a modified code block;
    compressing the modified code block creating a compressed modified code block;
    replacing the at least one of the plurality of kernel code blocks with the compressed modified code block; and
    repeating these steps until the upgrading is completed;
  wherein the CramFS file system comprises a plurality of compressed file system blocks and wherein the updating the CramFS file system further comprises:
  a second agent updating at least one of the plurality of compressed file system blocks in a RAM using the update package, individually, and storing them in the CramFS file system with each of the at least one of the plurality of compressed file system blocks having an associated updated compressed block that is stored; and
  releasing the each of the at least one of the plurality of compressed file system blocks after the associated updated compressed block has been stored.

* * * * *

UNITED STATES PATENT AND TRADEMARK OFFICE
CERTIFICATE OF CORRECTION

| | | |
|---|---|---|
| PATENT NO. | : 7,814,474 B2 | Page 1 of 1 |
| APPLICATION NO. | : 11/316291 | |
| DATED | : October 12, 2010 | |
| INVENTOR(S) | : Shao-Chun Chen et al. | |

It is certified that error appears in the above-identified patent and that said Letters Patent is hereby corrected as shown below:

In column 10, line 33, in Claim 12, delete "manner." and insert -- manner; --, therefor.

Signed and Sealed this
Twenty-sixth Day of April, 2011

David J. Kappos
*Director of the United States Patent and Trademark Office*